US006929582B2

(12) United States Patent
Yang et al.

(10) Patent No.: US 6,929,582 B2
(45) Date of Patent: Aug. 16, 2005

(54) METHOD FOR CONTROLLING VARIABLE COMPRESSION RATIO OF AN ENGINE HAVING AN AUTOMATICALLY CONTROLLED TRANSMISSION

(75) Inventors: Woong-chul Yang, Ann Arbor, MI (US); Ilya Kolmanovsky, Ypsilanti, MI (US); Davorin Hrovat, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 10/677,944

(22) Filed: Oct. 1, 2003

(65) Prior Publication Data

US 2005/0075212 A1    Apr. 7, 2005

(51) Int. Cl.⁷ .............................................. B60K 41/04
(52) U.S. Cl. ...................................................... 477/107
(58) Field of Search ........................................ 477/107

(56) References Cited

U.S. PATENT DOCUMENTS

| | | | |
|---|---|---|---|
| 4,492,195 A * | 1/1985 | Takahashi et al. ..... | 123/339.11 |
| 4,585,101 A | 4/1986 | Danno | |
| 5,038,635 A | 8/1991 | Takizawa | |
| 5,123,302 A * | 6/1992 | Brown et al. ................ | 477/154 |
| 5,243,881 A * | 9/1993 | Hayashi ........................ | 477/45 |
| 5,303,794 A * | 4/1994 | Hrovat et al. ................ | 180/197 |
| 5,484,353 A * | 1/1996 | Lux et al. .................... | 477/169 |
| 5,882,279 A * | 3/1999 | Ueki ........................... | 477/168 |
| 6,063,004 A * | 5/2000 | Ibamoto et al. ................ | 477/47 |
| 6,076,353 A * | 6/2000 | Freudenberg et al. ....... | 60/605.2 |
| 6,079,204 A * | 6/2000 | Sun et al. ..................... | 60/274 |
| 6,083,140 A | 7/2000 | Kimura | |
| 6,188,944 B1 * | 2/2001 | Kolmanovsky et al. ....... | 701/54 |
| 6,254,510 B1 * | 7/2001 | Rauch et al. ................ | 477/132 |
| 6,386,351 B1 * | 5/2002 | Salecker et al. ........... | 192/54.1 |
| 2001/0002379 A1 | 5/2001 | Schechter | |

* cited by examiner

*Primary Examiner*—Dirk Wright
(74) *Attorney, Agent, or Firm*—Allan J. Lippa; Alleman Hall McCoy Russell & Tuttle LLP

(57) ABSTRACT

A system is described for minimizing engine torque disturbances that would otherwise cause degraded drive feel by a vehicle driver. The system utilizes multiple torque transmission paths of a transaxle unit mounted to the engine. The system manipulates the torque transmitted by adjusting the clutches of multiple torque transmission paths so that the torque disturbance in the engine results in relatively constant vehicle drive torque. In one example, a potential torque increase due to variation in engine compression ratio is reduced using multiple paths of the transmission. In this way, relatively constant output torque can be maintained.

16 Claims, 3 Drawing Sheets

METHOD FOR CONTROLLING VARIABLE COMPRESSION RATIO OF AN ENGINE HAVING AN AUTOMATICALLY CONTROLLED TRANSMISSION

FIELD OF THE INVENTION

The present invention relates to a system and method for minimizing torque disturbances caused by changing engine compression ratio.

BACKGROUND OF THE INVENTION

Automotive vehicle engines use various mechanisms and adjustments to vary compression ratio of gasses in the cylinders. Specifically, various approaches are available for adjusting compression ratio during engine and vehicle operation, thereby allowing for improved optimization of fuel economy, emissions, and performance.

The inventors herein have recognized, however, that when transitioning between differing compression ratios during engine operation, such as from low compression to high compression, there may be a disturbance in torque produced by the engine. This disturbance can be such as to be noticed by the vehicle operator, and thereby reduce customer drive feel and satisfaction.

One approach to mitigate torque disturbances in engines has been to utilize adjustment in ignition timing (or spark timing). However, the inventors herein have recognized that spark adjustment authority (or range), may be limited depending on the operating conditions of the engine and vehicle. Therefore, the full compensation of the disturbance may not be achievable in a wide variety of operating conditions. As just one example, ignition timing may be limited by engine knock, or engine misfire limits.

SUMMARY OF THE INVENTION

The above disadvantages are overcome by a system, comprising:
an engine having a compression ratio that can be adjusted during engine operation;
an actuation unit coupled to said engine for adjusting said compression ratio during engine operation;
a torque transmitting unit having at least a first and second torque transmission path coupled to said engine, with said at least two torque transmission paths having a clutch that affects torque of said respective path; and
a control unit for controlling said torque transmitting unit and said actuation unit, said controller providing an indication of an engine torque output disturbance caused by adjustment of said actuation unit, and adjusting a clutch parameter of at least one of the first and second clutches based on an said engine torque output disturbance to reduce effects of said engine torque output disturbance on a vehicle drive torque.

By using such a system, the engine torque disturbances caused by varying compression ratio during engine operation can be reduced. In other words, the engine torque disturbances can be managed by providing and utilizing multiple transmission paths controlled via the clutches.

In an alternative embodiment, the above disadvantages are overcome by a method for controlling output of a vehicle powertrain having an engine with a variable compression ratio mechanism and a torque transmitting unit with multiple transmission paths including multiple clutches, the vehicle also having a electronic control unit. The method comprises:
determining whether compression ratio of the engine should be adjusted; and
in response to adjusting said compression ratio based on said determination, transmitting torque through said torque transmitting unit via at least two paths, and adjusting a clutch parameter of at least one of the clutches of said torque transmitting unit to reduce an engine output disturbance cause by said adjusting of said compression ratio.

The above advantages, other advantages, and other features of the example embodiments will be readily apparent from the following detailed description and the following drawings, taken alone or in combination.

DETAILED DESCRIPTION OF EMBODIMENT(S) OF THE INVENTION

Figure 1:
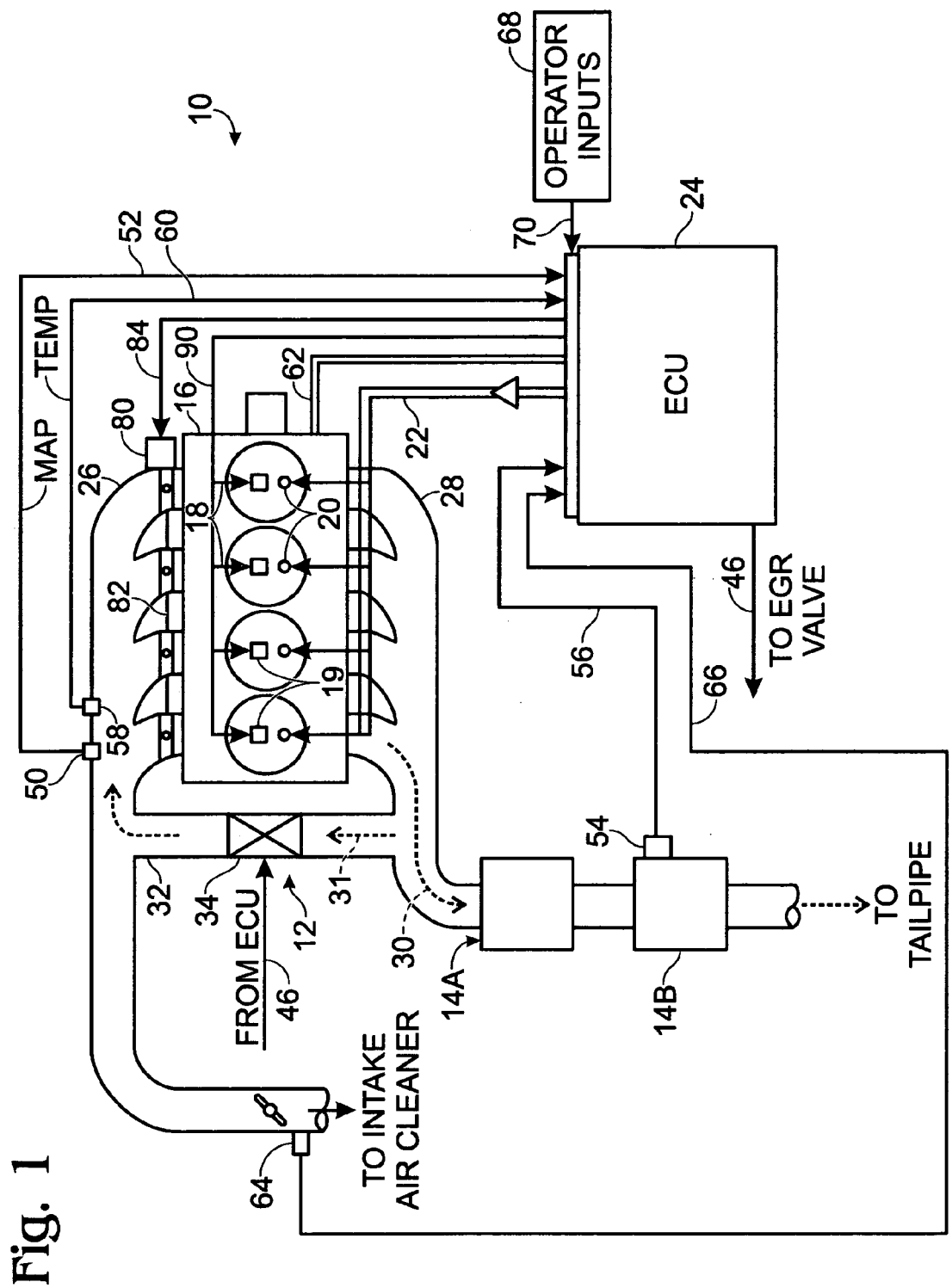
FIGS. 1–3 are a schematic view of an engine system having a transmission in accordance with an embodiment of the present invention.

Turning first to FIG. 1, there is shown a simplified schematic diagram of an engine system 10 equipped with an exhaust gas recirculation (EGR) system 12. The engine exhaust has an upstream catalyst 14A and a downstream catalyst 14B. In the case where engine 10 is a gasoline engine (either directly injected as shown, or port fuel injected), catalysts 14A and 14B can store oxidants (NOx and O2) when operating lean and release the stored oxidants when operating stoichiometric or rich. Alternatively, in the case where engine 10 is a diesel, compression ignition engine, upstream catalyst 14A can be a diesel particulate filter and downstream catalyst 14B can be a lean NOx catalyst such as an SCR catalyst. Alternatively, only a single catalyst could be used that operates both as a lean NOx catalyst and a particulate filter.

A representative engine block 16 is shown having four combustion chambers 18. Each of the combustion chambers 18 includes a direct-injection fuel injector 24. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions and increase fuel economy, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31, denoted as Wegr. An EGR valve 34 recirculates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

A swirl control valve 80 adjusts position of the swirl valve 82 via control signal 84, sent from controller 24. This valve restricts air entering the combustion chambers, thereby creating different engine combustion burn rates.

All of the engine systems, including the EGR 12, swirl control valve 80, and fuel injectors 20, are controlled by the ECU. For example, signal 46 from the ECU 24 regulates the EGR valve position. Further, controller 24 also control ignition of the spark plugs 19 via a signal 90.

In the ECU 24, the command signals 46, 90, and 22 to the EGR 12 actuator, the ignition coils/plugs, and the fuel injectors are calculated from measured variables and engine operating parameters by means of a control algorithm. Sensors and calibratable look-up tables residing in ECU memory provide the ECU 24 with engine operating information. For example, an intake manifold pressure (MAP) sensor 50 provides a signal (P1) 52 to the ECU indicative of the pressure in the intake manifold 26. Likewise, an intake manifold temperature sensor 58 provides a signal (Tm, or TEMP) 60 to the ECU 24 indicative of the intake manifold temperature. A mass airflow (MAF) sensor 64 also provides a signal (Wth) 66 indicative of the compressor mass airflow to the ECU 24. Further still, sensor 54 provides an indication of downstream catalyst temperature (TEMP) via line 56.

Additional sensory inputs can also be received by the ECU along signal line 62 such as engine coolant temperature, engine speed, and throttle position. Additional operator inputs 68 are received along signal 70 such as the accelerator pedal position or other fueling request input.

In one embodiment, engine 10 has a mechanically driven camshaft that actuates intake and exhaust valves. In another embodiment, engine 10 has an electromechanical actuator coupled to each intake and exhaust valve of the engine, known as a camless engine. In this case, each actuator's opening time, closing time, and even opening amount, can be controlled by the ECU 24. This timing is adjusted based on engine operating conditions and a driver request.

Figure 2:
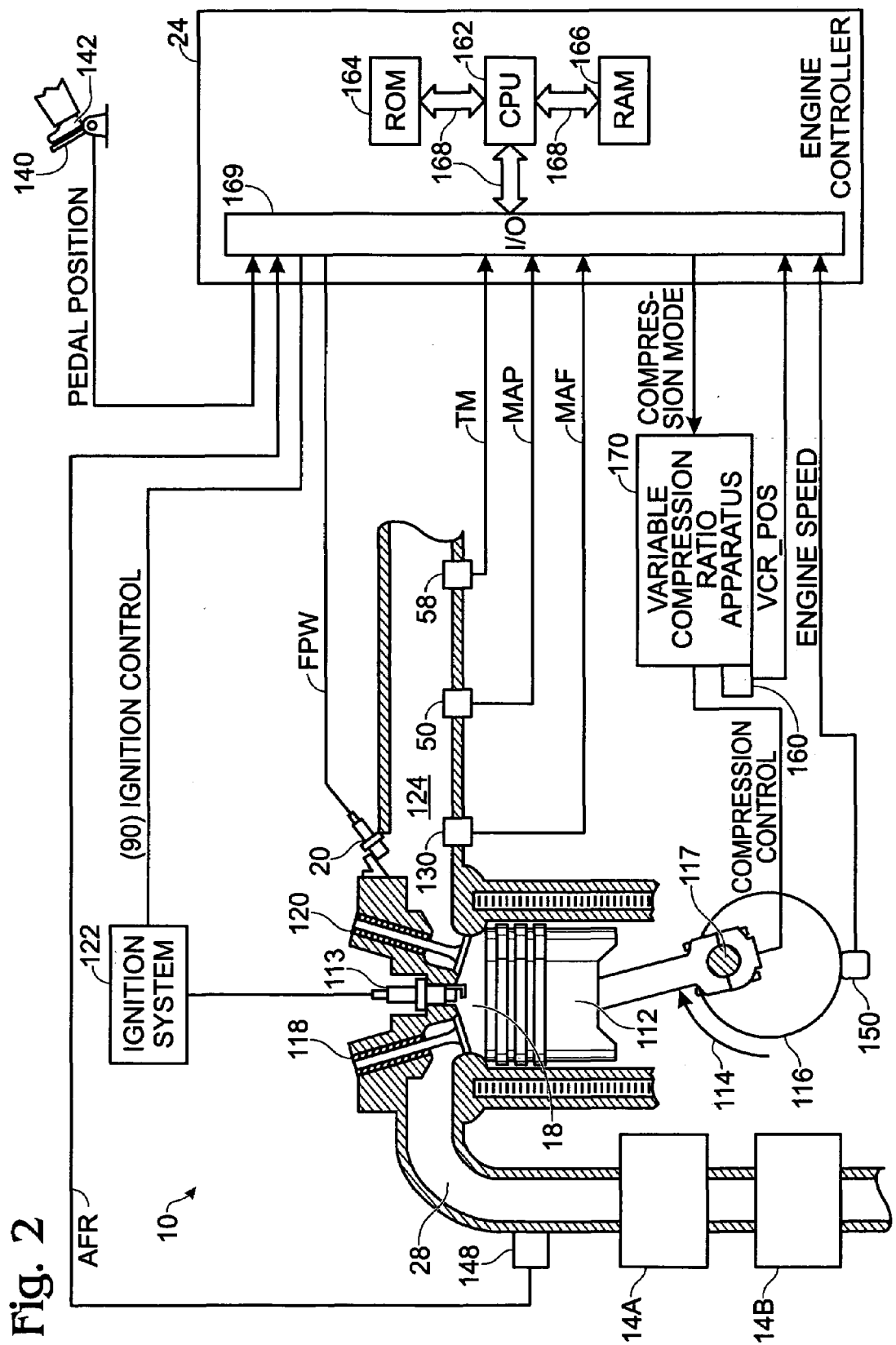

FIG. 2 shows a more detailed diagram of engine 10 and a system for operating a variable compression ratio internal combustion engine in accordance with an example embodiment of the present invention. The engine 10 shown in FIG. 2, by way of example and not limitation, is a gasoline four-stroke direct fuel injection (DI) internal combustion engine having a plurality of cylinders (only one shown), each of the cylinders having a combustion chamber 18 and corresponding fuel injector 20, spark plug 113, intake manifold 26, exhaust manifold 28, and reciprocating piston 112. The engine 10, however, can be any internal combustion engine, such as a port fuel injection (PFI) or diesel engine, having one or more reciprocating pistons as described above with regard to FIG. 1. Each piston of the internal combustion engine is coupled to a fixed-length connecting rod 114 on one end, and to a crankpin 117 of a crankshaft 116. Also, position sensor 150 is coupled to compression ratio mechanism 170 for measuring compression ratio position.

Exhaust manifold 28 is coupled to an emission control device 14A and exhaust gas sensor 148. Emission control device 14A can be any type of three-way catalyst, as described above, including various amounts of materials, such as precious metals (platinum, palladium, and rhodium) and/or barium and lanthanum. Exhaust gas sensor 148 can be a linear, or full range, air-fuel ratio sensor, such as a UEGO (Universal Exhaust Gas Oxygen Sensor), that produces a substantially linear output voltage versus oxygen concentration, or air-fuel ratio. Alternatively, it can be a switching type sensor, or HEGO (Heated Exhaust Gas Oxygen Sensor).

The reciprocating piston 112 is further coupled to a compression ratio mechanism 170 that is operated by an electronic engine controller 160 to vary the compression ratio of the engine. "Compression ratio" includes the ratio of the volume in the cylinder 18 above the piston 112 when the piston is at bottom-dead-center (BDC) to the volume in the cylinder above the piston 112 when the piston 112 is at top-dead-center (TDC). However, various other definitions of compression ratio can be used and are encompassed by the present invention. The compression ratio mechanism 170 is operated to effect a change in the engine's compression ratio in accordance with one or more parameters, such as engine load and speed, as described below herein. Such parameters are measured by appropriate sensors, such as a speed (RPM) sensor 150, mass air flow (MAF) sensor 130, pedal position sensor 140, compression ratio sensor 160, manifold temperature sensor 58, and manifold pressure sensor (50), which are electronically coupled to the engine controller 24. The compression ratio mechanism 170 can be any type of device that varies compression ratio of the engine, such as, for example, the system described in U.S. Pat. No. 6,595,187, the entire contents of which are incorporated herein by reference, in which the compression ratio adjustment is accomplished by adjusting the length of the connecting rod of the engine. Note that in this example, compression ratio is adjusted between two discreet compression ratios: a low compression ratio and a high compression ratio. Alternatively, a continuous adjustment between low and high compression ratios could be used.

Referring again to FIG. 2, the engine controller 24 includes a central processing unit (CPU) 158 having corresponding input/output ports 169, read-only memory (ROM) 50 or any suitable electronic storage medium containing processor-executable instructions and calibration values, random-access memory (RAM) 166, and a data bus 168 of any suitable configuration. The controller 160 receives signals from a variety of sensors coupled to the engine 10 and/or the vehicle, and controls the operation of the fuel injector 115, which is positioned to inject fuel into a corresponding cylinder 18 in precise quantities as determined by the controller 24. The controller 24 similarly controls the operation of the spark plugs 113.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 24.

Figure 3:
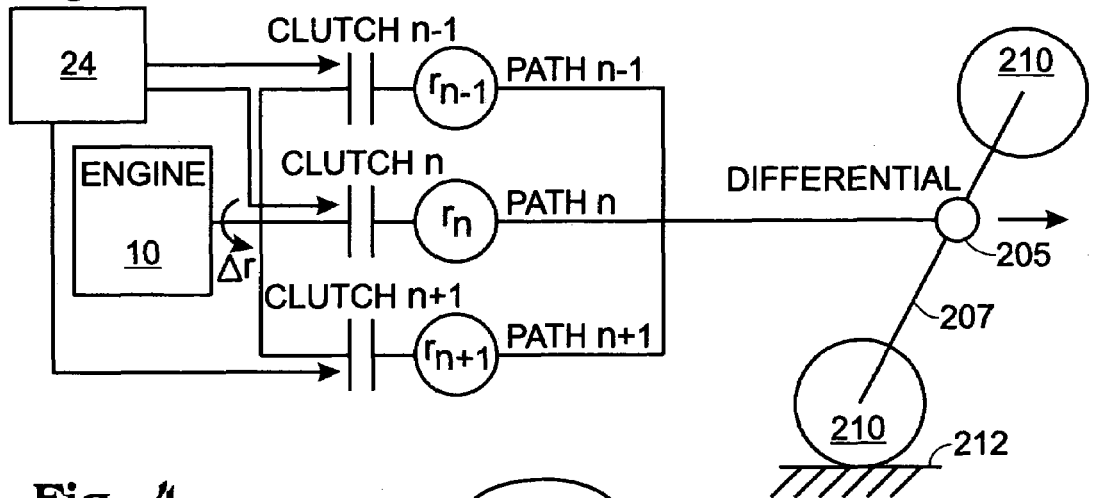
Figure 4:
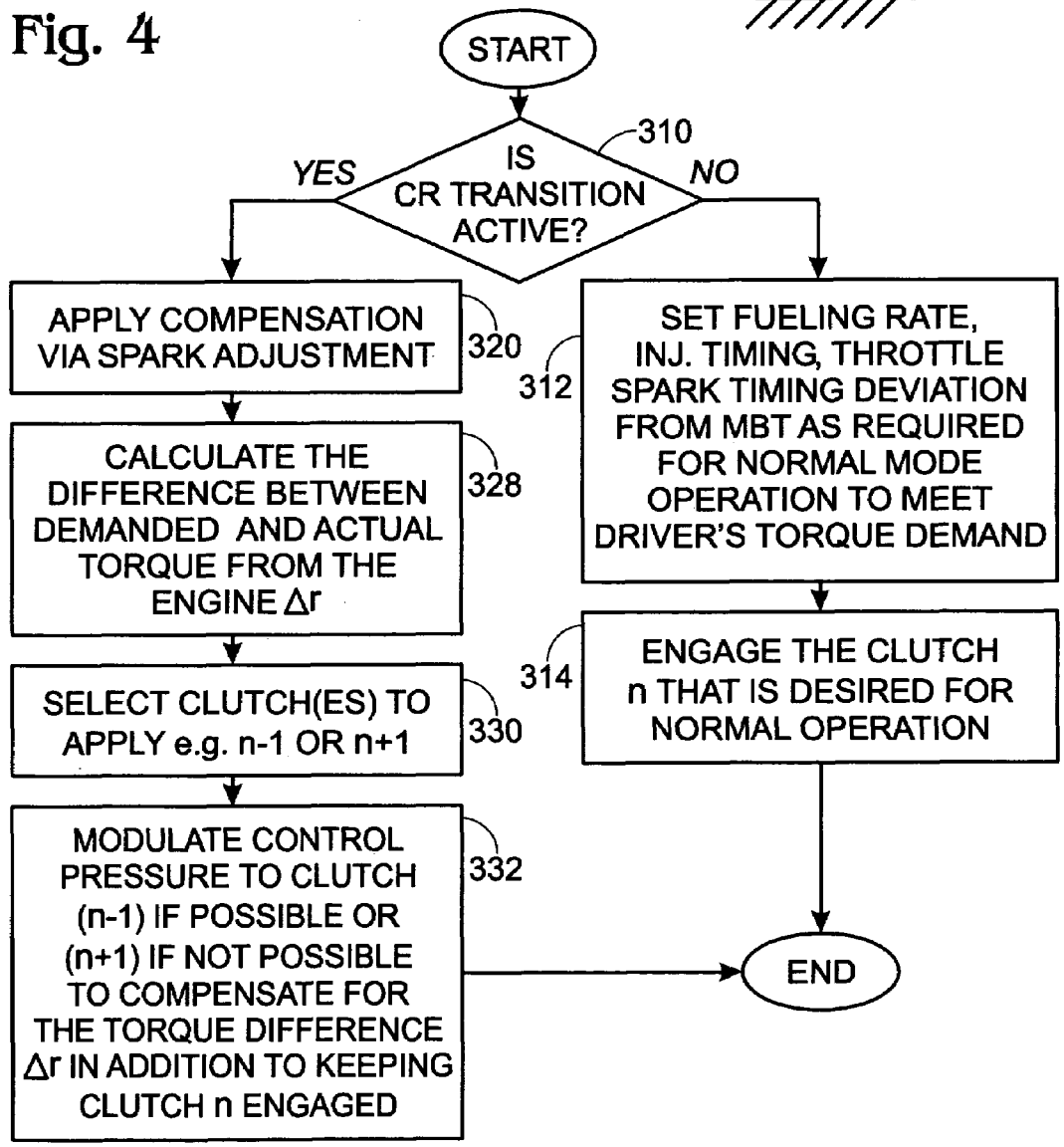
FIG. 4 is a block diagram of an engine control system in accordance with an embodiment of the present invention.

Engine 10 is also coupled to a transmission, or transaxle, unit as shown in FIG. 3. FIG. 3 specifically shows an example of a layshaft automatic transmission 200. However, as described below, any type of conventional automatic transmission having a variety of electronically controlled clutches and torque transmission paths can be used. Transmission 200 is coupled also to differential 205. Differential 205 is coupled to the drive shaft 207. Shaft 207 has two drive wheels (210), which link the powertrain to the road 212.

The example transmission 200 has a variety of transmission paths, shown in this example as paths n−1, n, and n+1.

While only three paths are shown, any number of paths can be used. For example, n may be selected as 2, giving a total of four paths.

Each path has a clutch (e.g., clutch n), which is electro-hydraulically controlled via controller 24. While an electro-hydraulic example is shown, any type of electro-mechanical control could be used. Further, each path as a gear ratio (r) associated with it. In this example, the ratios are related as shown below:

$$r_{n+1} < r_n < r_{n-1}$$

The engine and transmission control methods described herein apply to layshaft transmission, as well as conventional planetary gear type automatic transmissions, regardless of the type of fuel used. Thus, it is to be understood that references to gasoline engines are applicable to compression (diesel) ignition engines as well, and vice versa. In addition, throughout the specification, the following notations are used in describing measured or calculated variables:

| | |
|---|---|
| N | engine speed (RPM) |
| $\tau_n$ | clutch output torque for clutch n |
| $\omega_n$ | clutch slip for clutch n |
| $p_n$ | clutch pressure for clutch n |
| $r_n$ | gear ratio for path n |
| $\Delta\tau$ | torque disturbance (increase in engine torque) |

The disclosed engine control method can be implemented in a modular fashion with existing engine control schemes as shown in FIG. 3.

Example embodiments are described with a reference to a layshaft automatic transmission configuration. However, the underlying principles apply equally well in the case of a more conventional, planetary-gear transmission.

The layshaft transmission configuration is shown in FIG. 3, where (without loss of generality) it is assumed (for sake of clarity of description) that a Hondamatic-type of a transmission without a torque converter is used with each gear (n) having one associated clutch "n" with a gear ratio $r_n$, which represents the torque amplification from transmission input to transmission output, as describe above. Moreover, it is assumed that the vehicle is operating in gear n, which is neither the top nor the bottom gear, i.e., it is somewhere in the "middle". Note however, that a torque converter can easily be incorporated into the system, if desired.

For example, suppose that the strategy pre-announces (possibly a few seconds or less ahead) the intent to change compression ratio (e.g., switch from a low to high compression ratio) during a positive wheel torque operation ("power-on" case). Typically this may result in some engine net torque increase ($\Delta\tau$) for a few seconds or less. The effect of this torque increase on wheel torque can be reduced or in an ideal case completely neutralized by applying an appropriate amount of clutch (n+1) torque. This situation is similar to the torque (exchange) phase in the case of (power-on) upshifts. Assuming (without loss of generality) that the engine speed does not change during this torque application, the required clutch (n+1) output torque $\tau_{n+1}$ that is needed to cancel the effect of $\Delta\tau$ at transmission output (or, equivalently, at the wheels) is equal to:

$$\tau_{n+1}(p, \omega_{n+1}, T) = \Delta\tau \cdot r_n/(r_n - r_{n+1}) \qquad (1)$$

The required clutch output torque $t_{n+1}$ can be generated by appropriately modulating the control pressure p applied to the clutch. Recall that the clutch output torque is primarily a function of control pressure p and, to a lesser degree of a friction coefficient that in turn depends on clutch slip $\omega_{n+1}$, temperature T and other factors. Note that the temperature/thermal and related influence may be more important during the initial stroking (which would be more frequent for the present application), especially at lower temperatures. To compensate for these viscous effects, an appropriate model or approximation could be used. Specifically, for any slipping clutch with slip velocity co, the control pressure that need to be applied, p, can be determined from the expression:

$$P = \tau_d / [AN_s r_e \tau_f(\omega) \mu],$$

where A is the area of clutch friction surface, $N_s$ is the number of friction surfaces, $r_e$ is the effective radius of the clutch, $\mu$ is the friction coefficient, and $\tau_d$ is the desired clutch output torque. The $\tau_f$ is the generalized Stribeck friction function of the slip, i.e., $$\tau_f(\omega) = [1 + (T_s - 1)e^{-|\omega/\omega_s|^\delta} + b_v|\omega|] sgn(\omega)$$

where $T_s$ is the value of the torque at the so called breakaway point, $\omega_s$ is the Stribeck speed, $\delta$ is the Stribeck factor, and $b_v$ is the normalized viscous friction coefficient.

Note that under the above assumptions, the torques from clutch n and (n+1) have the same sign at the transmission output, and the resulting torque reduction is obtained by virtue of the fact that a portion of the input torque is now taken through a path with a smaller gain, i.e. $r_{n+1} < r_n$. In this sense, the clutch (n+1) can be seen as an actuator with a finer resolution. On the other hand, clutch (n–1) can serve as a large authority actuator since its output torque acts through a stronger gain $r_{n-1} > r_n$, and also the resulting output torque subtracts from clutch n torque due to the different direction of across-the-clutch slip between clutches n and (n–1).

In view of the above, the clutch (n–1) output torque increase that is required to fully counteract an input torque increase of ($\Delta\tau$) can be calculated by substituting ($-r_{n-1}$) for $r_{n+1}$ in Eq. 1 to yield:

$$\tau_{n-1}(p, \omega_{n-1}, T) = \Delta\tau \cdot r_n/(r_n + r_{n-1}) \qquad (2)$$

Note that due to the above sign change, the clutch (n–1) torque needs to increase much less than in the case of the (n+1) clutch, for the same input torque increase $\Delta\tau$. For example, using the data for a known transmission ($r_2 = 1.571$, $r_3 = 1$, $r_4 = 0.698$) it can be calculated that the ratio of the two clutch torques when operating in the $3^{rd}$ gear (i.e. n=3) is, $$\tau_{n-1}/\tau_{n+1} = (r_n - r_{n+1})/(r_n + r_{n-1}) = (r_3 - r_4)/(r_3 + r_2) = 0.118 \qquad (3)$$

from which it can be seen that the required torque for clutch (n–1) is almost an order of magnitude smaller.

One possible advantage of using clutch (n–1) is that the clutch energy dissipation is typically smaller than when an equivalent output torque effect is produced with the clutch (n+1). It can be shown that the ratio of the related two power dissipations is, $$P_{n-1}/P_{n+1} = (r_n - r_{n+1})/(r_n + r_{n-1}) = (r_2 - r_3)/(r_3 + r_2) = 0.22 \qquad (4)$$

where the last result is obtained for the above known transmission operating in the $3^{rd}$ gear. It can be seen that in this case the power dissipation using clutch 2 amounts to only 22% of the power dissipated by using clutch 4. This will result in corresponding fuel economy savings. In general, the clutch (n–1) would be used when larger and/or longer duration torque reduction is required, whereas clutch (n+1) would be used for faster and smaller interventions (due to larger torque levels used here, the related clutch bandwidth will also typically be larger). Obviously, the two could also be combined as appropriate.

As such, it is possible to effectively decrease the torque output using, in this example, a discrete ratio automatic transmission.

Another embodiment optionally contains a further provision of generating the control pressure to the additional clutch as a function of the difference between measured engine speed and desired engine speed or measured wheel speed and desired wheel speed. This provision applies in the instances when compression ratio change is desired while at the same time the cruise control is active. Further provisions of this example apply in a situation when a torque sensor is available in the output of the transmission. In this case, the control pressure to the additional clutch can be controlled as a function of the difference between the measured and desired torque.

Note that one example embodiment operates to change the path of the torque transmission, in variable amounts, between paths with different gear ratios. However, it is not necessary to attempt to shift the gear ratios. For example, the gear ratio before and after the torque disturbance can be the same gear ratio, unlike a conventional "shift", where the gear ratio after application, or deactivation, of clutches is different. In other words, the gear ratio of the transmission is the same before and after torque disturbance occurs. I.e., before the torque disturbance commences, and after is subsists (and the second torque transmission path is discontinued), the gear ratio can still be the same.

Thus, according to this example, it is possible to minimize engine torque, or power, disturbances by using manipulating the torque transmit through multiple paths of an automatic transaxle. This manipulation is performed by adjusting the application of clutches in the transaxle, even if the transaxle is not shifting gear ratios, i.e., even when the present gear is to be maintained.

In other words, by applying multiple clutches, and adjusting the clutch pressure (thereby adjusting how much torque is transmitted), it is possible to obtain relatively constant torque output at the drive wheels even when engine torque is increasing significantly. In this way, the vehicle drive torque is substantially unaffected by the disturbance and the vehicle driver's perception of the disturbance is minimized. For example, the variation in drive torque at the drive wheels is less than 5 percent of the total drive torque, even with a significant change in engine torque.

Referring now to FIG. 3, a routine describing operation according to one embodiment is described. First, in step 310, a determination is made as to whether the variable compression ratio adjustment is active. Note that the compression ratio can be adjusted based on various factors such as desired engine torque, engine speed, engine airflow, temperatures, and others.

When the answer to step 310 is "no", the routine continues to step 312 where the fueling rate, the injection timing, the throttle angle, the spark timing deviation from maximum torque timing (MBT) are set as required for normal mode operation to meet the driver's torque demand. Then, in step 314, the routine operates the clutch end that is desired for a normal operation.

When the answer to step 310 is "yes", the routine continues to step 320. In step 320, the routine first applies compensation for torque disturbances using ignition timing (or spark) adjustments. Then, in step 328, the routine calculates the difference between the required or demanded and actual torque from the engine ($\Delta\tau$). In one example, the demanded engine torque is determined based on at least one of a driver demanded torque, desired idle speed control torque, desired cruise control torque, and desired traction control torque. Then, the routine continues to step 330. In step 330, the routine selects the clutch or clutches to apply. For example, the routine determines whether to apply clutch n−1, or clutch n+1. For example, as described above herein, if fuel economy requirements are taken into consideration, then the clutch corresponding to the higher gear ratio is selected. Alternatively, if a larger torque disturbance is expected, then the clutch with the lower gear ratio can be selected. From step 330, the routine continues to step 332. In step 332, the routine controls clutch pressure to the selected clutch path to compensate for the torque disturbance in addition to keeping the current clutch end engaged.

Regarding step 332, note that after the torque disturbance subsides ($\Delta\tau$ is less than a preselected calabratable amount), the modulation of the applied clutch (n−1, or n+1 as the case may be) is discontinued (i.e., the applied clutch is disengaged and all torque is transmitted through the original torque transmission path, path n in this example).

The example algorithm and computer code described above compensates the torque increase from the engine during a transition from low to high compression ratio and reduce effects on the vehicle behavior. To compensate a high to low compression ratio transition, the engine aircharge can be first increased in the high compression ratio mode while reducing the increased engine torque from affecting the vehicle operation by the above described dual torque path transmission operation. The amount of the required increase in the engine aircharge is calculated so that the engine torque would be approximately equal to the requested if the compression ratio were at the low value. Once the increased aircharge level is achieved, the compression ratio can switch from high to low and the transmission can return to a single path (normal) operation. In this way, it is possible to reduce effects of both a transition from high to low compression ratio, and from low to high compression ratio.

Note that there are various alterative embodiments of the present invention. For example, as discussed above, a torque converter can be placed between the engine and the transmission, so that the engine is coupled to the transmission through a torque converter.

We claim:

1. A system, comprising:
   an engine having a compression ratio that can be adjusted during engine operation;
   an actuation unit coupled to said engine for adjusting said compression ratio during engine operation;
   a torque transmitting unit having at least a first and second torque transmission path coupled to said engine, with said at least two torque transmission paths having a clutch that affects torque of said respective path; and
   a control unit for controlling said torque transmitting unit and said actuation unit, said controller providing an indication of an engine torque output disturbance caused by adjustment of said actuation unit, and adjusting a clutch parameter of at least one of the first and second clutches based on an said engine torque output disturbance to reduce effects of said engine torque output disturbance on a vehicle drive torque.

2. The system of claim 1 wherein said actuation unit adjusts a length of a connecting rod of the engine.

3. The system of claim 1 wherein said torque transmitting unit is an automatic transmission.

4. The system of claim 3 further comprising a torque converter.

5. A system, comprising:

an engine having a compression ratio that can be adjusted during engine operation; an actuation unit coupled to said engine for adjusting said compression ratio during engine operation;

a torque transmitting unit having at least a first and second torque transmission path coupled to said engine, with said at least two torque transmission paths having a clutch that affects torque of said respective path; and a control unit for controlling said torque transmitting unit and said actuation unit, said controller providing an indication of an engine torque output disturbance caused by adjustment of said actuation unit, and adjusting a clutch pressure of at least one of the first and second clutches based on an said engine torque output disturbance so that a vehicle drive torque is substantially unaffected by said torque disturbance.

6. The system of claim 5 wherein said actuation unit adjusts a length of a connecting rod of the engine.

7. The system of claim 6 wherein said torque transmitting unit is an automatic transmission.

8. The system of claim 7 further comprising a torque converter.

9. A method for controlling output of a vehicle powertrain having an engine with a variable compression ratio mechanism and a torque transmitting unit with multiple transmission paths including multiple clutches, the vehicle also having a electronic control unit, the method comprising:

determining whether compression ratio of the engine should be adjusted; and in response to adjusting said compression ratio based on said determination, transmitting torque through said torque transmitting unit via at least two paths, and adjusting a clutch parameter of at least one of the clutches of said torque transmitting unit to reduce an engine output disturbance cause by said adjusting of said compression ratio.

10. The method of claim 9 wherein said determination of whether compression ratio of the engine should be adjusted is based on operating conditions.

11. The method of claim 10 wherein said transmitting torque through torque transmitting unit via at least two paths reduced engine output.

12. The method of claim 11 wherein said clutch parameter is a hydraulic clutch pressure.

13. The method of claim 11 wherein said adjusting of said clutch parameter is based on an estimate of engine output torque increase.

14. The method of claim 9 further comprising selecting said at least two paths based on engine operating conditions.

15. The method of claim 9 further comprising selecting said at least two paths based on engine fuel economy.

16. The method of claim 9 wherein said adjusting of said compression ratio adjusts compression ratio between a low compression ratio and a high compression ratio.

* * * * *